United States Patent
Lee et al.

(10) Patent No.: US 7,533,257 B2
(45) Date of Patent: May 12, 2009

(54) SERVER AUTHENTICATION VERIFICATION METHOD ON USER TERMINAL AT THE TIME OF EXTENSIBLE AUTHENTICATION PROTOCOL AUTHENTICATION FOR INTERNET ACCESS

(75) Inventors: Sok Joon Lee, Daejeon (KR); Byung Ho Chung, Daejeon (KR); Kyo Il Chung, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 970 days.

(21) Appl. No.: 10/927,407

(22) Filed: Aug. 24, 2004

(65) Prior Publication Data
US 2005/0138351 A1  Jun. 23, 2005

(30) Foreign Application Priority Data
Dec. 23, 2003  (KR) .................. 10-2003-0095403

(51) Int. Cl.
| | |
|---|---|
| H04L 9/00 | (2006.01) |
| H04L 9/32 | (2006.01) |
| G06F 7/04 | (2006.01) |
| G06F 7/58 | (2006.01) |
| G06F 17/30 | (2006.01) |
| G06K 9/00 | (2006.01) |
| G06K 19/00 | (2006.01) |
| H04K 1/00 | (2006.01) |
| G06F 7/00 | (2006.01) |

(52) U.S. Cl. .................. 713/155; 726/10; 726/21; 713/156; 713/158; 713/175; 707/3; 707/9; 707/10; 705/76; 705/78

(58) Field of Classification Search ............... 713/155, 713/156, 158, 175; 726/26, 10, 21; 705/76, 705/78; 707/3, 9, 10
See application file for complete search history.

(56) References Cited

U.S. PATENT DOCUMENTS

| 6,970,862 B2 * | 11/2005 | Kwan ............................ 707/3 |
| 2002/0035685 A1 * | 3/2002 | Ono et al. ................... 713/155 |
| 2003/0056096 A1 | 3/2003 | Albert et al. |
| 2004/0064691 A1 * | 4/2004 | Lu et al. ...................... 713/158 |
| 2004/0111607 A1 * | 6/2004 | Yellepeddy ................. 713/155 |
| 2006/0155984 A1 * | 7/2006 | Tsuchida et al. ............ 713/156 |
| 2007/0079381 A1 * | 4/2007 | Hartung et al. ............... 726/26 |

FOREIGN PATENT DOCUMENTS

| KR | 1020020020134 | 3/2002 |
| KR | 1020030035025 A | 5/2003 |
| KR | 1020030053280 A | 6/2003 |

* cited by examiner

*Primary Examiner*—Shin-Hon Chen
(74) *Attorney, Agent, or Firm*—Blakely, Sokoloff, Taylor & Zafman LLP (57) ABSTRACT

A server certificate verification method in a terminal during Extensible Authentication Protocol authentication for Internet access is provided, the method including (a) receiving a server certificate from a wireless LAN authentication server, and transmitting a server certificate verification request message of the server certificate to a wireless LAN authentication server via a wireless LAN access server; (b) transmitting by the wireless LAN authentication server an On-line Certificate Status Protocol request message to an On-line Certificate Status Protocol server to verify the server certificate; (c) receiving a result of the server certificate verification performed by the OCSP server using an Extensible Authentication Protocol packet from the wireless LAN authentication server; and (d) determining whether the result of the server certificate verification is valid.

6 Claims, 6 Drawing Sheets

FIG. 2

CONVENTIONAL CODE
1 : REQUEST
2 : RESPONSE
3 : SUCCESS
4 : FAILURE

ADDITIONAL CODE
11 : OCSP-REQUEST
12 : OCSP-RESPONSE
13 : CRL-REQUEST
14 : CRL-RESPONSE

SERVER AUTHENTICATION VERIFICATION METHOD ON USER TERMINAL AT THE TIME OF EXTENSIBLE AUTHENTICATION PROTOCOL AUTHENTICATION FOR INTERNET ACCESS

BACKGROUND OF THE INVENTION

This application claims the benefit of Korean Patent Application No. 2003-95403, filed on Dec. 23, 2003, in the Korean Intellectual Property Office, the disclosure of which is incorporated herein in its entirety by reference.

1. Field of the Invention

The present invention relates to a method of mutual authentication between a user and an authentication server, which is an advance procedure for using Internet services, and more particularly, to a method of verifying a server certificate during mutual authentication.

2. Description of the Related Art

There are several ways to access the Internet, such as wireless LAN public network, Point-to-Point Protocol (PPP), and wireless Internet using Code Division Multiple Access (CDMA). For example, network construction according to IEEE 802.11 standards is generally used for a wireless LAN. IEEE 802.11 standards realize a LAN environment such as conventional ethernet or IEEE 802.3 standards without wire. In a wireless LAN public network service, users entering an area called a hot spot must perform an authentication procedure according to proper mechanism provided by the wireless LAN service provider, such as IEEE 802.1x, web-based login, etc.

To provide the net service, a service provider performs an authentication procedure to determine whether the user subscribes to the service. Currently, Extensible Authentication Protocol (EAP) is a protocol used to perform authentication of a user. The EAP does not perform an real authentications, it is a protocol encapsulating and transmitting methods performing the real authentication such as Message Digest number 5 (MD 5), Transport Layer Security (TLS), Secure Remote Password (SRP). Various authentication protocols besides the EAP are used, but the EAP is more flexible and extensible, and it tends to be selected for roaming among service providers and different networks.

Especially, EAP-TLS is used to transmit TLS packets inside of the EAP and performs mutual authentication and key exchange using a certificate based on a Public Key Infrastructure (PKI). EAP-Tunneled TLS (EAP-TTLS) is a protocol in which users use passwords and servers perform mutual authentications and key exchange using the certificate. In the EAP-TLS and the EAP-TTLS protocol the validity of the certificate sent from the server must be verified in order to authenticate the server. However, some network device cannot access the Internet until the authentication has been completed(e.g. in a wireless LAN public network service based on IEEE 802.1x standards). Thus, it is impossible to use Certificate Revocation List (CRL) to verify the server certificate on-line or to perform a certificate verification inquiry using an On-line Certificate Status Protocol (OCSP).

SUMMARY OF THE INVENTION

The present invention provides a method of server certificate verification when it is impossible to access the Internet because a connection is not complete, in the circumstance of selecting EAP to perform mutual authentication using certificate.

The present invention also provides a computer readable recording medium which stores a program for executing the method.

According to an aspect of the present invention, there is provided A server certificate verification method performed by a wireless LAN user terminal during Extensible Authentication Protocol authentication for Internet access, the method comprising: (a) receiving a server certificate from a wireless LAN authentication server, and transmitting a server certificate verification request message of the server certificate to a wireless LAN authentication server via a wireless LAN access server; (b) transmitting by the wireless LAN authentication server an On-line Certificate Status Protocol request message to an On-line Certificate Status Protocol server to verify the server certificate; (c) receiving a result of the server certificate verification performed by the OCSP server using an Extensible Authentication Protocol packet from the wireless LAN authentication server; and (d) determining whether the result of the server certificate verification is valid.

According to another aspect of the present invention, there is provided A server certificate verification method in a terminal during Extensible Authentication Protocol authentication for Internet access, the method comprising: (a) receiving a server certificate from the wireless LAN authentication server and transmitting a server certificate verification request message to a wireless LAN authentication server via a wireless LAN access server; (b) transmitting an On-line Certificate Status Protocol request message to an On-line Certificate Status Protocol server to verify the server certificate; (c) receiving a result of the server certificate verification performed by the OCSP server using an Extensible Authentication Protocol packet from the wireless LAN authentication server; (d) transmitting a certificate and a key message of the user terminal to the wireless LAN authentication server when the result of the server certificate verification is valid; (e) transmitting by the wireless LAN authentication server an Online Certificate Status Protocol message to the Online Certificate Status Protocol server to verify certificate of the user terminal in response to the certificate and the message of the user terminal; (f) receiving a server finished message in response to a result of the user terminal certificate verification performed by the Online Certificate Status Protocol server, from the wireless LAN authentication server; and (g) recognizing that authentications of the wireless LAN user terminal and the wireless LAN authentication server are successfully performed when the server finished message transmitted from the wireless LAN authentication server is valid.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
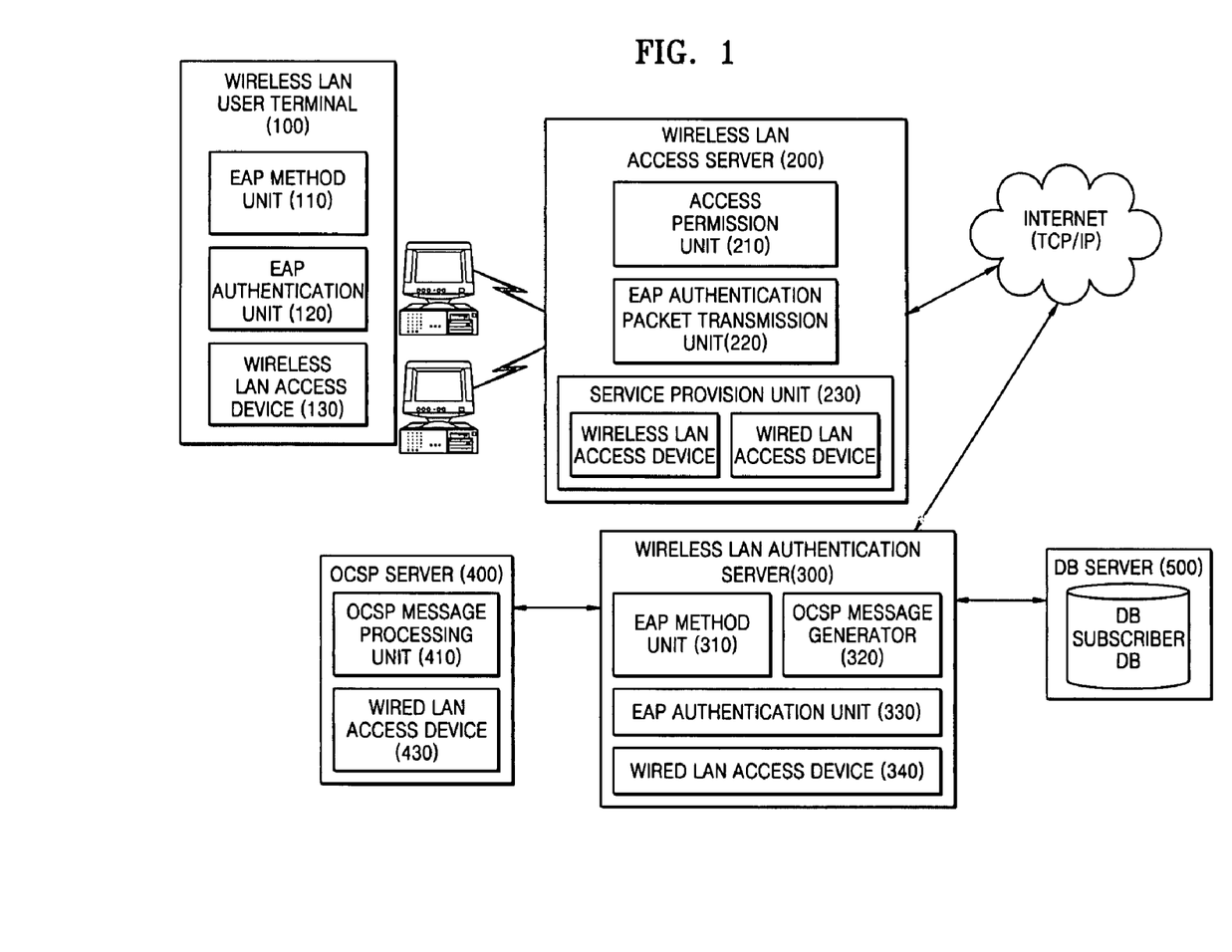
FIG. 1 is a block diagram of a wireless LAN public network performing mutual authentication according to an embodiment of the present invention.

FIG. 1 is a unit diagram of a wireless LAN public network performing mutual authentication according to an embodiment of the present invention. Referring to FIG. 1, the wireless LAN public network according to an embodiment of the present invention includes a wireless LAN user terminal 100, a wireless LAN access server 200, a wireless LAN authentication server 300, an Online Certificate Status Protocol (OCSP) server 400, and a database server 500.

The wireless LAN user terminal 100 includes an Extensible Authentication Protocol (EAP) method unit 110, an EAP authentication unit 120, and a wireless LAN access device 130. The wireless LAN user terminal 100 is a computer capable of the wireless LAN access, and a user tries to access the Internet using the terminal 100. When the user tries to access Internet, the EAP method unit 110 generates an authentication request message and processes a message relevant to authentication of a server. The EAP authentication unit 120 generates an EAP packet by encapsulating the authentication request message generated by the EAP method unit 110, verifies validation of a server certificate request message, and receives a result of authentication from the wireless LAN authentication server 300. The wireless LAN access device 130 sends/receives the authentication request message and user data generated after connecting to the Internet.

The wireless LAN access server 200 includes an access permission unit 210, an EAP authentication packet transmission unit 220, and a service provision unit 230. When a service permission message is received from the wireless LAN authentication server 300 by the connection permission unit 210, the access permission unit 210 connects a permitted wireless LAN user terminal to the Internet server for access Internet. The EAP authentication packet transmission unit 220 transmits an EAP packet received from the wireless LAN user terminal 100 to the wireless LAN authentication server 300, and transmits the EAP packet received from the wireless LAN authentication server 300 to the wireless LAN user terminal 100. The service provision unit 230 includes a wireless LAN access device and a wired LAN access device to connecting a wireless and a wired access, making Internet access possible.

The wireless LAN authentication server 300 includes an EAP method unit 310, an OCSP message generator 320, an EAP authentication unit 330, and a wired LAN access device 340. The EAP method unit 310 processes an authentication request message of a user and generates a message related to the authentication request message of the user. The OCSP message generator 320 processes a server certificate verification request message received from the user. The EAP authentication unit 330 encapsulates a message to fit an EAP protocol, which the EAP method unit 310 or the OCSP message generator 320 transmits to the wireless LAN user terminal 100. The wired LAN access device 340 connects a user to the Internet via a wire.

The wireless LAN authentication server 300 is connected to the database server 500, and refers to and amends data in a subscriber database storing authentication information.

The OCSP server 400 includes an OCSP message processing unit 410 and a wired LAN access device 420. The OCSP message processing unit 410 processes the OCSP message received from the wireless LAN authentication server 300 to verify a certificate and transmits the result to the wireless LAN authentication server 300. The wired LAN access device 420 connects a user to the Internet via a wire.

In the wireless LAN user terminal 100, the authentication request message is generated by the EAP method unit 110 to access the Internet and is encapsulated to the EAP packet via the EAP authentication unit 120 to provide necessary information to the EAP authentication unit 330 of the wireless LAN authentication server 300. A response can be transmitted from the wireless LAN authentication server 300 to the wireless LAN user terminal. When the server certificate is received by the EAP method unit 110, the EAP method unit 110 requests the EAP authentication unit 120 to generate a server certificate verification request message, and the EAP authentication unit 120 generates the server certificate verification request message and transmits the same to the wireless LAN authentication server 300 via the EAP authentication packet transmission unit 220 of the wireless LAN access server 200.

When the server certificate verification request message is received, the EAP authentication unit 330 of the wireless LAN authentication server 300 requests the OCSP message generator 320 to generate an OCSP message to be transmitted to the OCSP server 400. The OCSP message generator 320 generates the OCSP message and transmits the OCSP message to the OCSP server 400. The OCSP message processing unit 410 of the OCSP server 400 processes the OCSP message received from the wireless LAN authentication server 300, verifies the certificate, transmits a result of verifying the certificate to the wireless LAN authentication server 300. In the wireless LAN authentication server 300, the EAP authentication unit 330 encapsulates the result of processing the OCSP message received from the OCSP server 400 and transmits the encapsulated result to the wireless LAN user terminal 100 via the EAP authentication packet transmission unit 220 of the wireless LAN access server 200.

Figure 2:
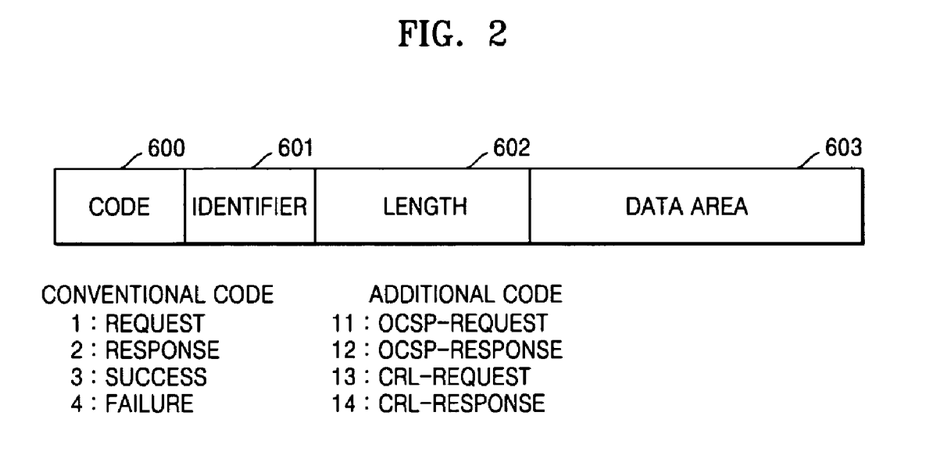
FIG. 2 illustrates a configuration of a server certificate verification message according to an embodiment of the present invention.

FIG. 2 illustrates the configuration of the server certificate verification message, which is transmitted between the EAP authentication unit 120 of the wireless LAN user terminal 100 and the EAP authentication unit 330 of the wireless LAN authentication server 300 shown in FIG. 1. The server certificate verification message has a structure according to a configuration of EAP (IETF RFC 2284).

Referring to FIG. 2, the server certificate verification message according to an embodiment of the present invention includes a code area 600, an identifier area 601, a message length area 602, and a data area 603. The code area 600 stores a code value indicating the sort of a message type, and the identifier area 601 stores an identifier value for an identity of a message. The length of message area 602 stores a message length value, and the data area 603 stores additional data of the message.

A code area of a conventional EAP message stores code values of 1 to 4, but the code area 600 according to an embodiment of the present invention stores additional code values of 11 to 14 to exchange the server certificate verification message using OCSP or a Certificate Revocation List (CRL) message.

For example, when the wireless LAN user terminal 100 will perform the server certificate verification using the OCSP server 400, the code area 600 stores the code value 11 (which represents OCSP-REQUEST.), and the data area 603 stores real OCSP request message. If in order to update the CRL, the code area 600 stores the code value 13 (which represents CRL-REQUEST.), the data area 603 stores a CRL request Uniform Resource Locator (URL).

When the wireless LAN authentication server 300 receives an EAP message in which the code area 600 stores the code value 11, the wireless LAN authentication server 300 transmits the message to the OCSP server 400, receives a result of processing OCSP from the OCSP server 400 indicating that the code value 12 (which represents OCSP-RESPONSE.) is to be stored in the code area 600 and stores the OCSP result message in the data area 603. In this case, if the wireless LAN authentication server 300 receives an EAP message in which the code area 600 stores the code value 13 (which represents CRL-REQUEST.), the wireless LAN authentication server 300 receives a CRL referring to a URL stored in the data area 603 of a corresponding message, the code value 14 is stored in the code area 600, the CRL is stored in the data area 603, and the EAP message is transmitted to the wireless LAN user terminal 100. In this case, the OCSP message is structured according to IETF RFC 2560, and a form of the CRL is structured according to IETF RFC 2459.

Figure 3:
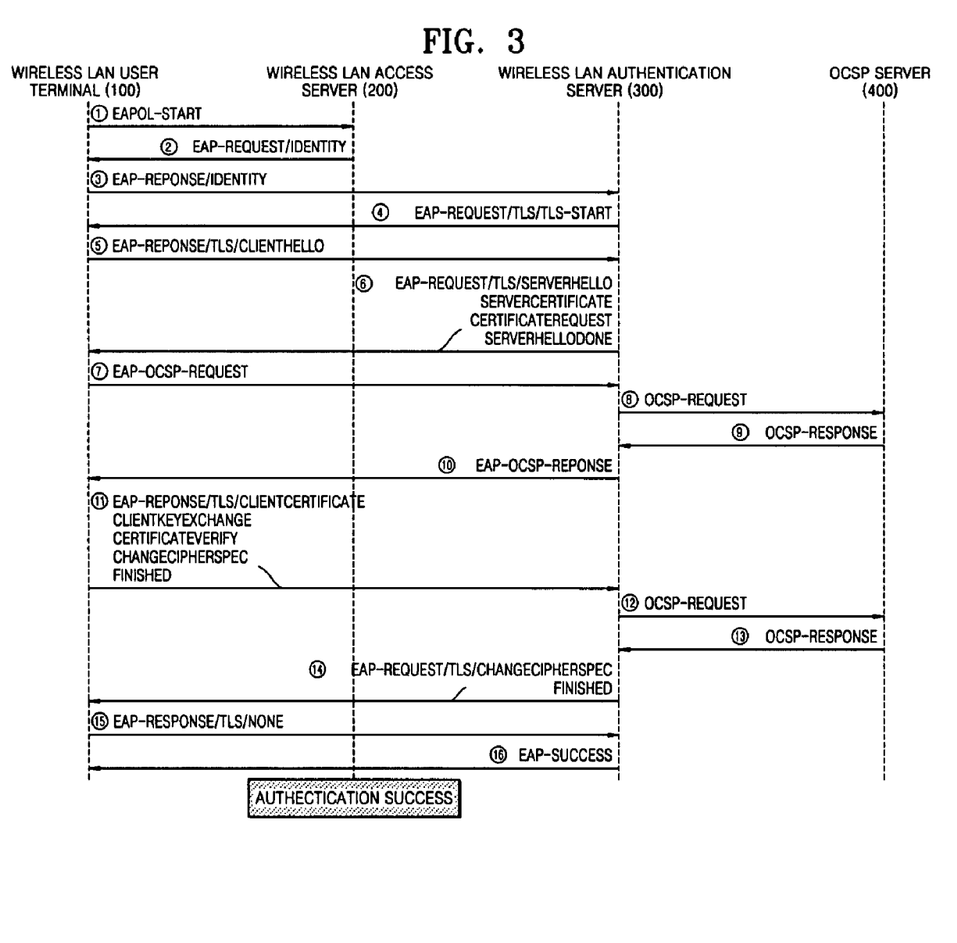
FIG. 3 illustrates a message transmission sequence according to a server certificate verification using EAP-Transport Layer Security (TLS) in the wireless LAN public network shown in FIG. 1.

FIG. 3 is a diagram illustrating a message transmission sequence according to the server certificate verification using an EAP-Transport Layer Security (TLS) in the wireless LAN public network shown in FIG. 1, and verification processes of certificates of servers and user terminals are all illustrated.

Referring to FIG. 3, the wireless LAN user terminal 100 transmits an EAPOL-START message to the wireless LAN access server 200 in order to perform the EAP authentication (refer to arrow 1), and the wireless LAN access server 200 requests user authentication information identity from the wireless LAN user terminal 100 (refer to arrow 2). The wireless LAN user terminal 100 responds to the user authentication information request by transmitting the user authentication information to the wireless LAN authentication server 300, and initiates an authentication interchange (refer to arrow 3).

When the user authentication information is received from the wireless LAN user terminal 100, the wireless LAN authentication server 300 transmits an EAP-TLS start message to the wireless LAN user terminal 100 and starts the EAP-TLS (refer to arrow 4). The wireless LAN user terminal 100 then generates a random number and transmits the random number and a client start message CLIENTHELLO to the wireless LAN authentication server 300 (refer to arrow 5), and the wireless LAN authentication server 300 also generates a random number and transmits the random number, a server start message SERVERHELLO and a certificate to the wireless LAN user terminal 100 (refer to arrow 6).

The wireless LAN user terminal 100 receives the certificate from the wireless LAN authentication server 300, generates a server certificate verification request message EAP-OCSP-REQUEST, and transmits the same to the wireless LAN authentication server 300 (refer to arrow 7). When the server certificate verification request message is received from the wireless LAN user terminal 100, the wireless LAN authentication server 300 transmits a certificate validity request message OCSP-REQUEST of the wireless LAN authentication server 300 to the OCSP server 400 (refer to arrow 8). The OCSP server 400 responds to the certificate validity request message OCSP-REQUEST by verifying the server certificate, and transmits a verification result OCSP-RESPONSE to the wireless LAN authentication server 300 (refer to arrow 9). The wireless LAN authentication server 300 receives the server certificate verification result transmitted from the OCSP server 400, produces an EAP message and transmits the EAP message to the wireless LAN user terminal 100 (refer to arrow 10).

The wireless LAN user terminal 100 generates a master key using the two random numbers generated by the wireless LAN user terminal 100 and the wireless LAN authentication server 300, respectively, and a shared key generated by the wireless LAN user terminal 100. The wireless LAN user terminal 100 then encrypts the shared key using a public key included in the certificate of the wireless LAN authentication server 300, and responds to the certificate verification result OCSP-RESPONSE transmitted from the wireless LAN authentication server 300 by and transmitting a certificate and a key message to the wireless LAN authentication server 300 (refer to arrow 11).

When the certificate and the key message of the wireless LAN user terminal 100 are received, the wireless LAN authentication server 300 extracts the shared key using a private key belonging to the wireless LAN authentication server 300 and generates a master key with two random numbers. The wireless LAN authentication server 300 transmits the certificate verification request message of the wireless LAN user terminal 100 using the OCSP to the OCSP server 400 (refer to arrow 12). The OCSP server 400 responds the OCSP message OCSP-REQUEST transmitted from the wireless LAN authentication server 300 by verifying certificate of the wireless LAN user terminal 100 and transmitting the verification result OCSP-RESPONSE to the wireless LAN authentication server 300 (refer to arrow 13).

The wireless LAN authentication server 300 responds to the certificate of the wireless LAN user terminal 100 verification result OCSP-RESPONSE transmitted from the OCSP server 400 by transmitting a server finished message to the wireless LAN user terminal 100 (refer to an arrow 14). The wireless LAN user terminal 100 determines whether the server finished message transmitted from the wireless LAN authentication server 300 is valid and transmits a result of determination to the wireless LAN authentication server 300 (refer to arrow 15). When the server finished message is confirmed to be valid by the response message transmitted from the wireless LAN user terminal 100, the wireless LAN authentication server 300 transmits a message informing that the EAP authentication has been successfully performed EAP-SUCCESS to the wireless LAN user terminal 100 (refer to arrow 16).

As described above, in an embodiment of the present invention, the server certificate validity is verified using the EAP-TLS, and when connection is not complete and Internet access is not possible, it is possible to verify the server certificate, a user may access Internet service more safely. In particular, the server certificate verification method according to an embodiment of the present invention does not require an upgrade of an existing Internet access server or new equipment, and is realized by changing an access program of a user terminal and partial module of an authentication server.

FIG. 3 illustrates a method of accessing the OCSP server 400 in order to verify the server certificate, but it is only an embodiment of the present invention, and a method in which a CRL bulletin of an official authentication organ is applied may be formed as described above. In this case, the only difference is that the sequence in which the CRL bulletin is received by URL is used instead of requesting the server certificate verification from the OCSP server.

Figure 4:
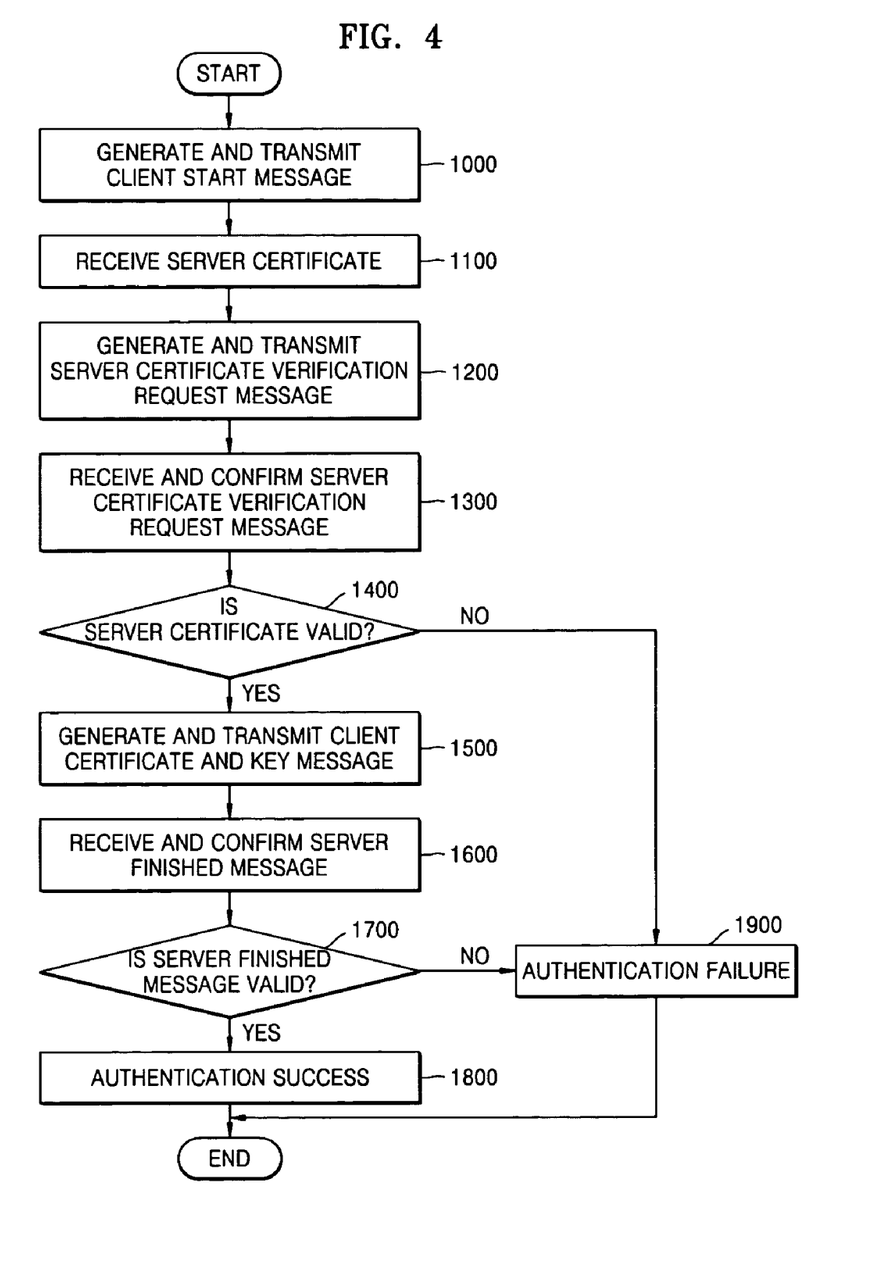
FIG. 4 is a flow chart illustrating a server certificate verification method using the EAP-TLS performed in the wireless LAN user terminal shown in FIGS. 1 and 3.

FIG. 4 is a flow chart illustrating a server certificate verification method using the EAP-TLS performed in the wireless LAN user terminal shown in FIGS. 1 and 3.

Referring to FIGS. 3 and 4, when a user authentication session using the EAP-TLS is started, the wireless LAN user terminal 100 generates a client start message and transmits the client start message to the wireless LAN authentication server 300 (Operation 1000, refer to the arrow 5 of FIG. 3). When the client start message is transmitted to the wireless LAN authentication server 300, the wireless LAN authentication server 300 responds to the client start message to start the user authentication session by transmitting the server certificate previously stored in order to verify the real authentication server to the wireless LAN user terminal 100 (refer to arrow 6 of FIG. 3).

The wireless LAN user terminal 100 receives the server certificate from the wireless LAN authentication server 300, in Operation 1100, and requests the EAP authentication unit 120 via the EAP method unit 110 to generate the server certificate verification request message. When the EAP authentication unit 120 generates the server certificate verification request message, the wireless LAN user terminal 100 transmits the server certificate verification request message to the wireless LAN authentication server 300, in Operation 1200 (refer to arrow 7 of FIG. 3).

When the server certificate verification request message is received from the wireless LAN authentication server 300, the wireless LAN user terminal 100 receives the server certificate verification request message, in Operation 1300 (refer to arrow 10 of FIG. 3), and confirms whether a result of the server certificate verification request is valid, in Operation 1400.

When the result of the server certificate verification is determined to be valid, the wireless LAN user terminal 100 generates the client certificate and the key message according to the EAP-TLS and transmits the client certificate and the key message to the wireless LAN authentication server 300, in Operation 1500 (refer to arrow 11 of FIG. 3). The wireless LAN authentication server 300 receives the client certificate and the key message transmitted from the wireless LAN user terminal 100 and determines the client certificate validity. When the client certificate is valid, the server finished message is transmitted to the wireless LAN user terminal 100.

The wireless LAN user terminal 100 receives the server finished message from the wireless LAN authentication server 300, in Operation 1600 (refer to arrow 14), and determines whether the server finished message is valid, in Operation 1700. When the server finished message is valid as a result of determination in Operation 1700, the authentication is considered to be successful, in Operation 1800, and if the server finished message is not valid, the authentication is considered to have failed, in Operation 1900.

Figure 5A:
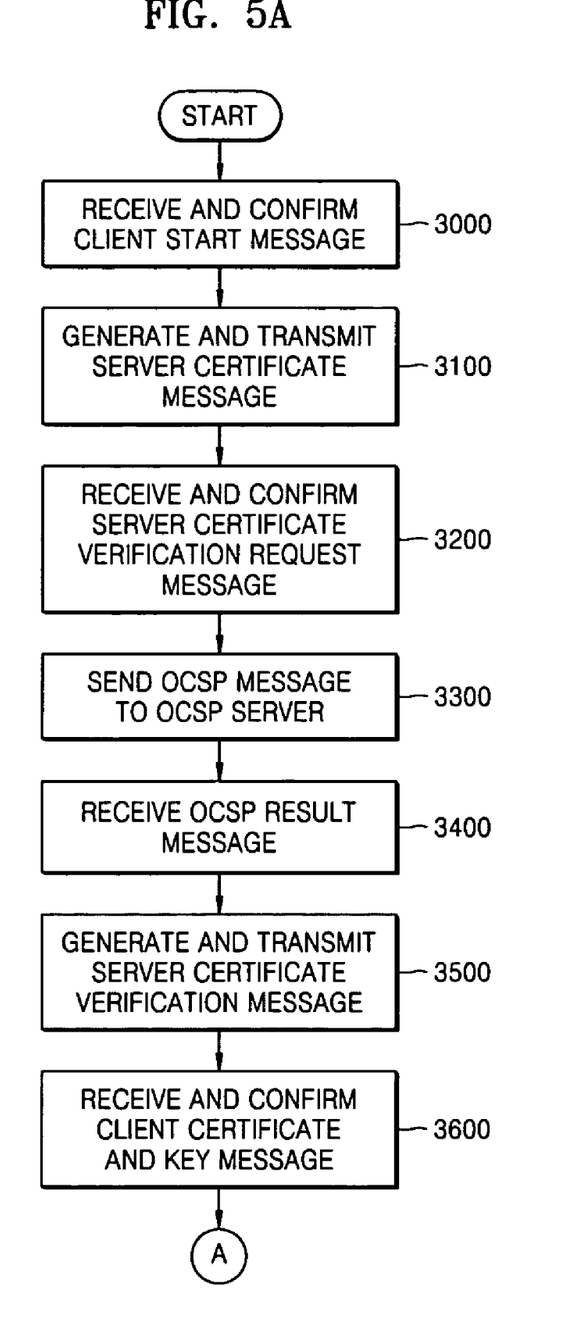
FIG. 5 is a flow chart illustrating a server certificate verification method using the EAP-TLS performed in the wireless LAN authentication server shown in FIGS. 1 and 3.
Figure 5B:
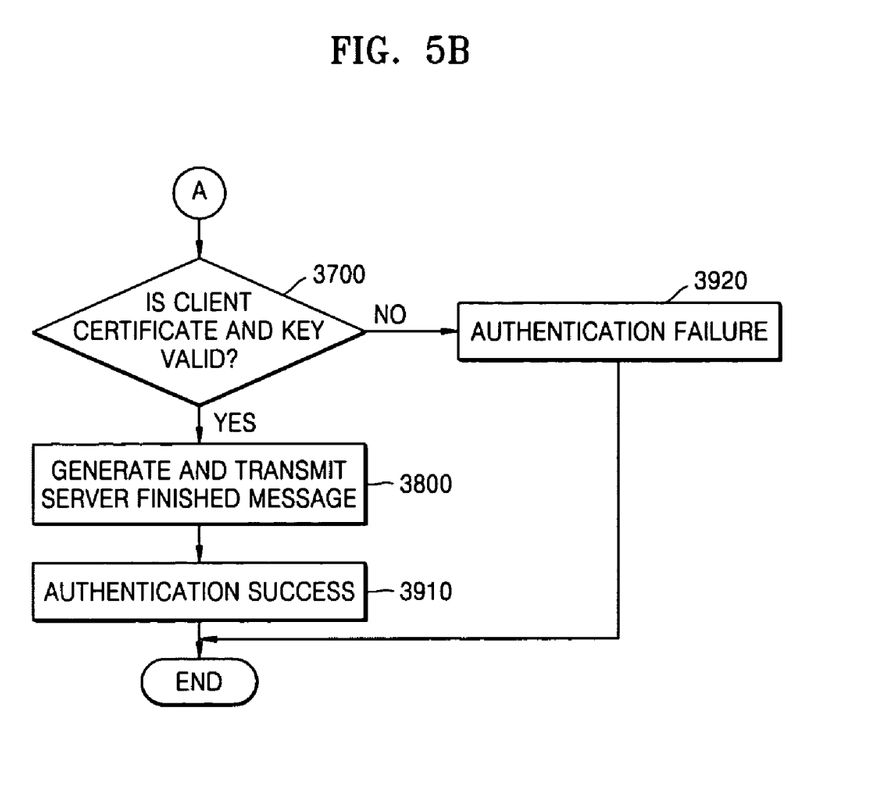

FIG. 5 is a flow chart illustrating a server certificate verification method using the EAP-TLS performed in the wireless LAN authentication server shown in FIGS. 1 and 3.

Referring to FIGS. 3 and 5, the wireless LAN authentication server 300 receives the client start message from the wireless LAN user terminal 100 to confirm the client start message, in Operation 3000 (refer to arrow 5 of FIG. 3), and transmits the server certificate stored previously in order to verify the real authentication server to the wireless LAN user terminal 100, in Operation 3100 (refer to arrow 6 of FIG. 3).

Next, when the server certificate verification request message is received from the wireless LAN user terminal 100, the wireless LAN authentication server 300 receives the server certificate verification request message via the EAP authentication unit 330, in Operation 3200 (refer to arrow 7 of FIG. 3), and transmits the OCSP request message via the OCSP message generator 320 to the OCSP server 400 in order to verify the server certificate needed in the EAP authentication, in Operation 3300 (refer to arrow 8 of FIG. 3). When a result of server certificate verification determined by the OCSP message processing unit 410 of the OCSP server 400 is received by the OCSP message generator 320, in Operation 3400 (refer to arrow 9 of FIG. 3), the received result is transmitted to the wireless LAN user terminal 100 via the EAP authentication unit 330 in the form of an EAP message, in Operation 3500 (refer to arrow 10 of FIG. 3).

After verifying the server certificate, when the server certificate is ascertained to be valid, the wireless LAN user terminal 100 transmits the client certificate and the key message to the wireless LAN authentication server 300 according to the EAP-TLS. The wireless LAN authentication server 300 receives the client certificate and the key message transmitted from the wireless LAN user terminal 100, in Operation 3600 (refer to arrow 11 of FIG. 3), and transmits the client certificate verification request message to the OCSP server 400 to verify the client certificate(refer to arrow 12 of FIG. 3).

The OCSP server 400 verifies the client certificate, transmits a verification result to the wireless LAN authentication server 300, and requests the wireless LAN authentication server 300 to determine whether the client certificate and the key message are valid, in Operation 3700 (refer to arrow 13 of FIG. 3).

When the client certificate and the key received are ascertained to be not valid as a result of the determination in Operation 3700, the wireless LAN authentication server 300 determines the authentication to fail and terminates the authentication session, in Operation 3920. When the client certificate and key are ascertained to be valid as a result of judgment in Operation 3700, the wireless LAN authentication server 300 generates the server finished message, transmits the server finished message to the wireless LAN user terminal 100, in Operation 3800 (refer to arrow 14 of FIG. 3), determines the authentication to be successful, and terminates the authentication session, in Operation 3910.

As described above, in the server certificate verification method according to embodiments of the present invention, in a mutual authentication between the user and the authentication server, validity of the server official certificate may be verified in an environment in which a connection is not completely performed so that Internet access is not made. Thus, users may safely access Internet services. Also, the server certificate verification method does not require upgrades to an existing Internet access server or new equipment, and is realized by changing an access program of a user terminal and partial module of an authentication server.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A server certificate verification method performed by a wireless LAN user terminal during Extensible Authentication Protocol authentication for Internet access, the method comprising:
   (a) receiving a server certificate from a wireless LAN authentication server, and transmitting a server certificate verification request message of the server certificate to the wireless LAN authentication server via a wireless LAN access server;
   (b) transmitting by the wireless LAN authentication server an On-line Certificate Status Protocol request message to an On-line Certificate Status Protocol (OCSP) server to verify the server certificate;
   (c) receiving a result of the server certificate verification performed by the OCSP server using an Extensible Authentication Protocol packet from the wireless LAN authentication server; and
   (d) determining whether the result of the server certificate verification is valid.

2. A server certificate verification method in a user terminal during Extensible Authentication Protocol authentication for Internet access, the method comprising:
   (a) receiving a server certificate from a wireless LAN authentication server and transmitting a server certificate verification request message to the wireless LAN authentication server via a wireless LAN access server;
   (b) transmitting an On-line Certificate Status Protocol (OCSP) request message to an On-line Certificate Status Protocol server to verify the server certificate;
   (c) receiving a result of the server certificate verification performed by the OCSP server using an Extensible Authentication Protocol packet from the wireless LAN authentication server;
   (d) transmitting a certificate and a key message of the user terminal to the wireless LAN authentication server when the result of the server certificate verification is valid;
   (e) transmitting by the wireless LAN authentication server an Online Certificate Status Protocol message to the Online Certificate Status Protocol server to verify the certificate of the user terminal in response to the certificate and the message of the user terminal;
   (f) receiving a server finished message in response to a result of the user terminal certificate verification performed by the Online Certificate Status Protocol server, from the wireless LAN authentication server; and
   (g) recognizing that authentications of the user terminal and the wireless LAN authentication server are successfully performed when the server finished message transmitted from the wireless LAN authentication server is valid.

3. The method of one of claims 1 and 2, wherein the operation (a) comprises:
   (a-1) receiving the server certificate via an Extensible Authentication Protocol method unit;
   (a-2) generating the server certificate verification request message in an Extensible Authentication Process authentication unit; and
   (a-3) transmitting the server certificate verification request message to the wireless LAN authentication server.

4. The method of one of claims 1 and 2, wherein the operation (b) comprises:
   (b-1) receiving the server certificate verification request message via an Extensible Authentication Protocol authentication unit;
   (b-2) requesting an Online Certificate Status Protocol message generation unit to generate an Online Certificate Status Protocol request message from the Extensible Authentication Protocol authentication unit;
   (b-3) transmitting the Online Certificate Status Protocol request message to the Online Certificate Status Protocol server from the Online Certificate Status Protocol message generation unit; and
   (b-4) verifying the server certificate in response to the Online Certificate Status Protocol request message with an Online Certificate Status Protocol message process unit of the Online Certificate Status Protocol server.

5. The method of one of claims 1 and 2, wherein a message used in the verification, method comprises:
   a code area storing a code value indicating a type of the message and an extensible code to verify the server certificate;
   an identifier area storing an identifier value identifying the message;
   a message length area storing a value of the message length; and
   a data area storing additional data of the message.

6. A computer readable storage medium which stores a program for executing the method of one of claims 1 and 2 in a computer.

* * * * *